(12) United States Patent
Hierzer

(10) Patent No.: US 9,726,339 B2
(45) Date of Patent: Aug. 8, 2017

(54) LUMINAIRE, ASSEMBLY FOR A GRID CEILING, METHOD FOR INSTALLING A LUMINAIRE, METHOD FOR REMOVING A LUMINAIRE, AND REMOVAL TOOL

(71) Applicant: H4X e.U., Graz (AU)

(72) Inventor: Andreas Hierzer, Graz (AT)

(73) Assignee: H4X e.U., Graz (AT)

( * ) Notice: Subject to any disclaimer, the term of this patent is extended or adjusted under 35 U.S.C. 154(b) by 1 day.

(21) Appl. No.: 14/488,592

(22) Filed: Sep. 17, 2014

(65) Prior Publication Data
US 2016/0010817 A1    Jan. 14, 2016

(30) Foreign Application Priority Data
Jul. 10, 2014    (DE) .......................... 10 2014 213 468

(51) Int. Cl.
| | |
|---|---|
| *F21V 21/00* | (2006.01) |
| *F21V 21/04* | (2006.01) |
| *F21S 8/04* | (2006.01) |
| *B23P 19/04* | (2006.01) |
| *F21S 8/02* | (2006.01) |

(52) U.S. Cl.
CPC ............... *F21S 8/043* (2013.01); *B23P 19/04* (2013.01); *F21S 8/026* (2013.01); *F21V 21/049* (2013.01)

(58) Field of Classification Search
CPC .................................. F21S 8/043; B23P 19/04
IPC ........................................................ B23P 19/04
See application file for complete search history.

(56) References Cited

U.S. PATENT DOCUMENTS

| | | | | |
|---|---|---|---|---|
| 3,704,906 A | * | 12/1972 | Abercrombie | .......... E05C 19/14 292/247 |
| 3,885,478 A | | 5/1975 | Evans | |
| 3,918,751 A | * | 11/1975 | Blake | .......... E05C 3/30 292/126 |
| 3,922,764 A | | 12/1975 | Downing, Jr. | |
| 4,424,554 A | | 1/1984 | Woloski | |
| 2008/0086962 A1 | | 4/2008 | Jahn | |
| 2010/0213654 A1 | * | 8/2010 | Lin | .......... F16F 1/06 267/157 |

(Continued)

FOREIGN PATENT DOCUMENTS

| | | |
|---|---|---|
| DE | 7429207 U | 12/1974 |
| DE | 198409216 U | 7/1984 |

(Continued)

OTHER PUBLICATIONS

Yoon, Korean Patent Publication 200453286, Apr. 2011, Foreign Full Text.*

(Continued)

*Primary Examiner* — Tracie Y Green
(74) *Attorney, Agent, or Firm* — Millen, White, Zelano & Branigan, P.C.; William Nixon

(57) ABSTRACT

A luminaire for installing in a grid ceiling includes at least one catch which is arranged in such a way on the luminaire and designed such that the at least one catch snaps into place automatically behind a portion of an element of the grid ceiling and thus engages behind the portion of the element of the grid ceiling in order to hold the luminaire on the grid ceiling. In addition, an assembly for a grid ceiling includes at least one ceiling profile element and at least one such luminaire.

12 Claims, 8 Drawing Sheets

(56) References Cited

U.S. PATENT DOCUMENTS

| | | | |
|---|---|---|---|
| 2011/0176295 A1* | 7/2011 | Chang | F21V 21/04 |
| | | | 362/147 |
| 2011/0235342 A1* | 9/2011 | Liang | F21V 21/04 |
| | | | 362/364 |
| 2011/0239503 A1 | 10/2011 | Liao | |
| 2012/0020067 A1* | 1/2012 | Mai | F21S 8/02 |
| | | | 362/217.14 |
| 2014/0003050 A1 | 1/2014 | Hemiller | |

FOREIGN PATENT DOCUMENTS

| | | |
|---|---|---|
| DE | 9207069 U1 | 9/1992 |
| DE | 20310974 U1 | 10/2003 |
| DE | 102004026738 A1 | 1/2006 |
| DE | 102010052520 A1 | 7/2011 |
| KR | 201103394 U | 4/2011 |

OTHER PUBLICATIONS

Yoon, Korean Patent Publication 200453286, Apr. 2011, machne translation.*
Official Action received in the corresponding German Patent Application No. 102014213468.4, dated Mar. 14, 2015.
Official Action received in the corresponding EP Patent Application No. 15175685.5 dated Nov. 2015.
Machine translation of DE198409216U1 published Jul. 19, 1984 to Doeberitz Peter.
Machine translation of KR201103394U published Apr. 6, 2011 to Hyosung Lighting Co. Ltd.

* cited by examiner

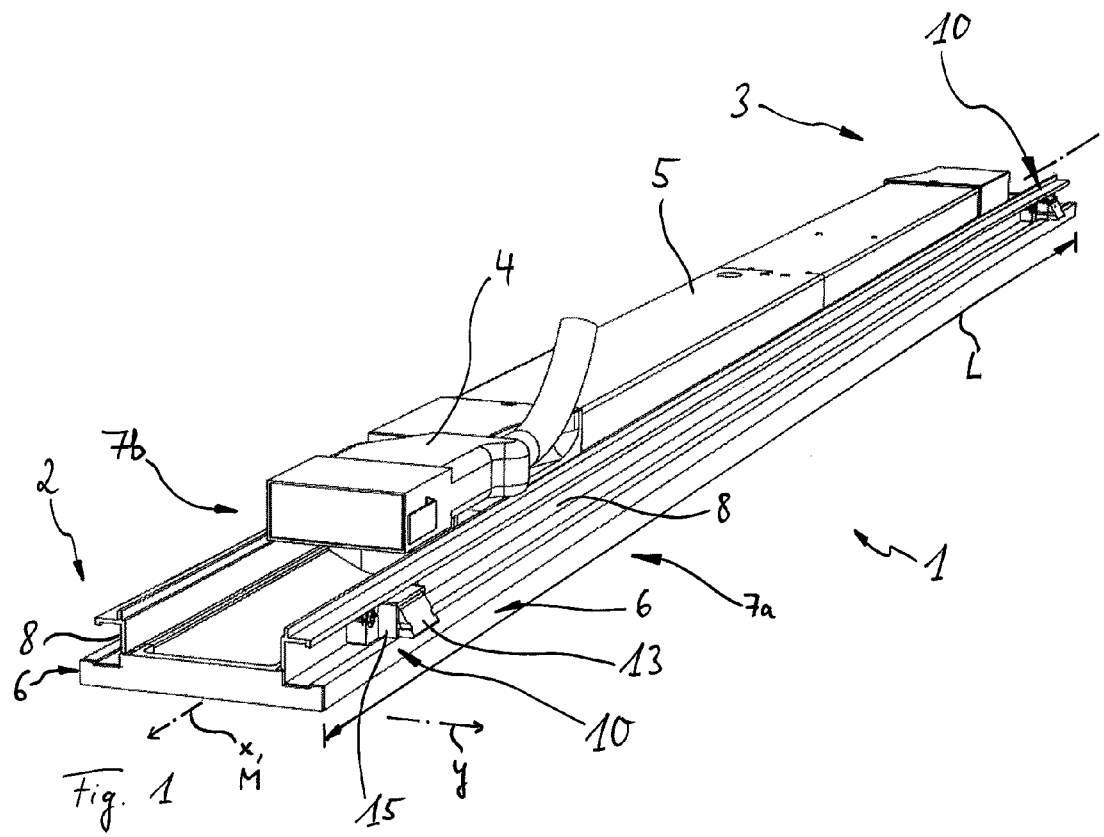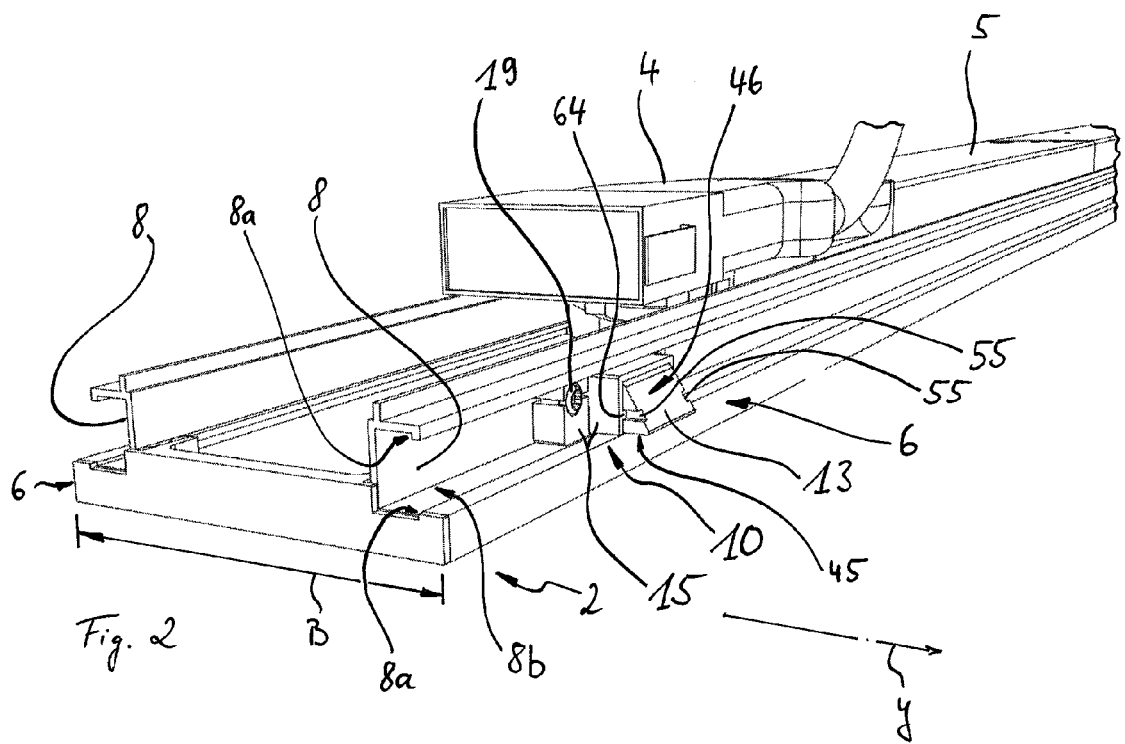

LUMINAIRE, ASSEMBLY FOR A GRID CEILING, METHOD FOR INSTALLING A LUMINAIRE, METHOD FOR REMOVING A LUMINAIRE, AND REMOVAL TOOL

FIELD OF THE INVENTION

The present invention relates to a luminaire for installing in a grid ceiling. In addition, the invention relates to an assembly for a grid ceiling, a method for installing a luminaire, a method for removing a fitted luminaire, and a removal tool.

BACKGROUND OF THE INVENTION

Building interiors in particular, for instance offices or business premises, are often fitted with suspended ceilings. Such ceilings can be designed to have a supporting structure and ceiling panels that form components of what is known as a grid ceiling system.

Suitable luminaires can be installed in the region of the ceiling to provide lighting to an interior fitted with a suspended ceiling. In particular, such luminaires can be integrated in the suspended ceiling for this purpose.

Owing to the installation position in the ceiling region, which often means that the installation engineer must work above head height, it would be desirable if installation of the luminaire in the region of a grid ceiling could be accomplished as quickly and simply as possible and at low cost. In addition, it would be desirable, for instance during alterations to the interior or if the luminaire needs to be taken out for other reasons, if an installed luminaire could be removed easily and in a manner requiring as little time and labour as possible.

SUMMARY OF THE INVENTION

In view of the above, one idea of the invention is thus to provide a luminaire that can be installed easily in the region of a grid ceiling and preferably can also be removed again easily. In addition, corresponding improvements should be made to a grid ceiling. It is also an object of the invention to create a method for easily and quickly installing a luminaire improved in such a way, and a method for removing such a luminaire easily and quickly, and to provide a suitable tool for this purpose.

Accordingly, a luminaire for installing in a grid ceiling is proposed that has at least one catch. According to the invention, the at least one catch is arranged in such a way on the luminaire and designed such that the at least one catch snaps into place automatically behind a portion of an element of the grid ceiling during installation of the luminaire. By snapping into place automatically, the at least one catch engages behind the portion of the element of the grid ceiling in order to hold the luminaire on the grid ceiling.

In addition according to the invention, an assembly for a grid ceiling is proposed that comprises at least one ceiling profile element and at least one such luminaire according to the invention. In this assembly, at least one movable catch of the at least one luminaire engages behind a portion of the ceiling profile element of the grid ceiling, the engaging of the catch behind the ceiling profile element holding the at least one luminaire on the grid ceiling.

The invention also provides a method for installing a luminaire according to the invention in a grid ceiling. The method comprises the steps of:

providing a luminaire according to the invention; and
moving the luminaire relative to at least one element of the grid ceiling, which element is arranged and fixed in a predefined final position assigned to the element for the purpose of forming the grid ceiling, in such a way that at least one catch of the luminaire snaps into place automatically behind a portion of the element of the grid ceiling, and by the automatic snapping into place engages behind the portion of the element of the grid ceiling in order to hold the luminaire on the grid ceiling.

In addition, the invention provides a method for removing a luminaire according to the invention that is installed in a grid ceiling. The method comprises the steps of:

inserting a designated removal tool in an insertion direction from a visible side of the grid ceiling into a gap between an element of the grid ceiling and the luminaire;

the removal tool engaging over a movable catch of the luminaire, which catch engages behind a portion of the element of the grid ceiling in order to hold the luminaire on the grid ceiling; and pulling on the removal tool in a direction substantially opposite to the insertion direction in order to apply to the catch a force that causes the catch to disengage from the portion of the element; when being pulled, the removal tool is guided in the gap between the element and the luminaire.

In addition, a removal tool is proposed for removing a luminaire according to the invention that is installed in a grid ceiling, which removal tool can be used in particular for removing the luminaire by means of the above method according to the invention. The removal tool has a first portion, a second portion connected to the first portion and extending laterally transverse to the first portion, and a tongue connected to the second portion. In this case, the tongue extends away from the second portion in substantially the same direction as the first portion. In some regions the first portion is in the form of a handle portion for handling the removal tool. The second portion, the tongue and part of the first portion delimit a recess, part of which recess is designed to be a catch holding region for holding a portion of a catch of the luminaire. When a portion of the catch is received in the catch holding region and rests against the second portion of the removal tool, then the tongue protrudes past the catch in the extension direction of the tongue from the second portion.

One idea forming the basis of the present invention is to use the geometry of at least one element of a grid ceiling in order to be able to fix the luminaire without tools in the region of the grid ceiling by means of a catch provided on the luminaire snapping into place automatically. This makes the luminaire far easier to install, which can prove advantageous especially when there are a relatively large number of luminaires to install and where there are large ceiling surface areas, as can arise in relatively large offices or business premises, for example. A grid ceiling having an assembly according to the invention can thus be installed more quickly and at a lower cost. In addition, obtrusive fixing elements that can be seen from the visible side of the grid ceiling are not required for the luminaire or the like, with the result that the grid ceiling containing the installed luminaire can be designed advantageously from the aesthetic viewpoint to be particularly attractive. The removal method provided by the invention and the removal tool allows rapid and safe removal of the luminaire if required. In addition, the protrusion of the tongue of the removal tool beyond the catch avoids the removal tool becoming caught and jammed when releasing the catch, because the tongue formed in this manner can advantageously be guided during the detachment process in a gap between the luminaire and the element of the grid ceiling behind which the catch is engaged An element of the grid ceiling shall be understood here to refer generally to a component of the grid ceiling, which component can have the widest variety of designs. For example, the element might be in the form of a profile or rail, such as a ceiling-profile element for instance, or else in the form of a panel or sheet, such as, for instance, in the form of a ceiling tile containing a cutout for accommodating the luminaire or the like, or in another form.

Advantageous embodiments and developments of the invention appear in the dependent claims and in the description with reference to the figures in the drawing.

In one embodiment, the at least one catch has a sloping slide. The sloping slide is arranged and oriented such that during installation of the luminaire, the sloping slide faces the grid ceiling and is at an angle to a direction along which the luminaire can be introduced into the grid ceiling in order to install said luminaire. This can make installing the luminaire even easier in that during the installation process, regions of the grid ceiling element can slide over the sloping slide and thereby depress the catch.

In another embodiment, the at least one catch is spring-loaded. The catch thereby snaps into place reliably behind the portion of the element of the grid ceiling.

In one embodiment, the at least one catch is arranged and spring-loaded such that on snapping into place it returns automatically to a position in which the at least one catch protrudes beyond an edge of the luminaire, in particular a lateral edge thereof. This makes it easier to release the catches later in order to remove the luminaire.

In one embodiment, the luminaire also comprises a catch housing. In this case, the at least one catch is displaceably guided in the catch housing. The catch housing can thus allow the catch to be guided in a reliable and defined manner.

In another embodiment, the at least one catch is displaceably guided in the catch housing. A guide allowing displacement of the catch can be implemented relatively easily and in a small amount of space. In addition in this case, it is easily possible in particular to bring into contact with the element a sufficiently large retaining surface of the catch for holding the luminaire.

According to another embodiment, the at least one catch and the catch housing, in which the at least one catch is guided, form components of a catch unit. In addition in this development, the luminaire comprises at least one groove in which the catch unit is fixed. The catch unit can thus in particular advantageously be preassembled and fixed inside the groove at the desired position during assembly of the luminaire.

In one embodiment, the catch unit is clamped in the groove and thereby fixed therein at least along the groove. Fastening the catch unit in the groove by clamping can allow the catch unit to be fixed reliably in a friction fit against moving along the groove, thereby avoiding making holes and the like in the luminaire for fixing the catch unit. In addition, the clamping can be released again, if the need for this arises, and the catch unit can be moved in the groove and reclamped in a different position.

In a further embodiment, the luminaire has a plurality of catches, wherein at least two of the catches are arranged on opposite sides of the luminaire. The luminaire can thereby advantageously engage behind elements of the grid ceiling adjacent to opposite sides of the luminaire in order to hold the luminaire on the ceiling even more reliably.

In particular, the plurality of catches can have the same design. This allows further cost savings in the manufacture of the luminaire and the assembly for the grid ceiling owing to the lower number of different individual parts to be produced.

In another embodiment, a plurality of catch units can be provided, each of which comprises one catch housing and one catch and which additionally are each fixed to the luminaire.

In another embodiment, at least two grooves can be provided for this purpose on the luminaire, which grooves are arranged on different sides of the luminaire and are intended to receive the catch units. Such an arrangement of the grooves combined with a plurality of catch units can offer a variety of options for arranging the catches on the luminaire.

According to a another embodiment, the luminaire comprises at least two catches of substantially the same design arranged on one side of the luminaire spaced apart from one another along a longitudinal direction of the luminaire. This embodiment allows even a relatively long luminaire to be held on the grid ceiling even more reliably. For particularly long luminaire lengths, it can be useful in particular to have more than two catches arranged spaced apart from one another on one longitudinal side of the luminaire in order to avoid the luminaire sagging under its own weight, for instance.

In another embodiment, the luminaire is equipped with at least four catches that are preferably designed and guided in the same manner. According to this embodiment, two of the catches are arranged spaced apart from one another on a first side of the luminaire, while two more of the catches are arranged spaced apart from one another on a second side of the luminaire. In this way, the luminaire can be inserted easily between two elements of the grid ceiling without being tilted during the installation, and can be installed reliably on the grid ceiling by snapping the catches into place behind portions of said elements.

In one embodiment, the catches can advantageously be made from a metal material, thereby achieving a more robust catch that can withstand a greater load.

In another embodiment, the element of the grid ceiling behind which the catch engages is a profile, in particular a ceiling profile element of the grid ceiling.

In the present application, a ceiling profile element shall be understood to mean generally a profile element that forms a component of the grid ceiling.

According to another embodiment, the ceiling profile element can be in the form of a component of a supporting structure of the grid ceiling, it being possible for the ceiling profile element to be designed in particular for supporting ceiling elements of the grid ceiling. By means of this embodiment, a ceiling profile element of the supporting structure can be used advantageously also for attaching the luminaire easily and quickly. The ceiling elements of the grid ceiling can be in the form of ceiling panels, ceiling tiles or the like, for example. In particular it can be provided that the ceiling profile element can be arranged and fixed separately from the ceiling elements in its final position, for instance in the region beneath a bare ceiling.

In an alternative embodiment, the ceiling profile element can be integrated in a ceiling element, for instance a ceiling panel or ceiling tile, or rigidly connected thereto. For instance in a variant of this embodiment, the ceiling element can be provided with a cutout, one or more ceiling profile elements being provided in the edge region of this cutout and being connected to the ceiling element, for example in the form of a shaft or the like.

According to one embodiment, the ceiling profile element is designed to have an inverted T-shape at least in one region of its cross-section. In this embodiment, the at least one catch of the at least one luminaire engages behind a portion of a flange segment of the inverted T-shaped region. Such a ceiling profile element can be advantageous for instance in terms of the mechanical load it can withstand. The cross-section of the ceiling profile element can have a different design from this, however, in other embodiments.

According to a further embodiment, the assembly also comprises at least one ceiling element, part of which rests on the ceiling profile element, it being possible for the at least one luminaire to in particular be substantially flush with the ceiling element or the ceiling profile element or both on a visible side of the grid ceiling. Such a flush assembly can be preferable from the aesthetic viewpoint.

In a development, the ceiling profile element can be configured as a component in the form of a rail, in particular made of a metal material.

In a further embodiment, it can be provided that at least two elements of the grid ceiling, in particular two ceiling profile elements, are each arranged at a respective predefined final position assigned to the element in order to form the grid ceiling, and are fixed in the final position. For instance, the elements can be arranged and fastened at a predefined separation from one another that is designed to suit the dimensions of the luminaire. In this embodiment, in order to install the luminaire, said luminaire is inserted between the at least two elements. This is done in such a way that during installation of the luminaire, the at least one catch automatically snaps into place behind a portion of one of the elements of the grid ceiling and thereby engages behind a portion of the element of the grid ceiling in order to hold the luminaire on the grid ceiling.

According to a further embodiment of the installation method, a luminaire that comprises at least two catches arranged on opposite sides of the luminaire, can be inserted advantageously between the at least two elements in the manner such that each of the catches snaps into place behind a portion of an associated element of the two elements.

In a further embodiment of the method for removing the luminaire, while pulling using the designated removal tool, a force is exerted on the sloping slide of the catch. In particular, it is thereby advantageously possible by pulling on the removal tool substantially along that direction in which the luminaire is held by the catch, for example along a direction vertical to the floor, by means of the sloping slide to exert on the catch a force that displaces the catch transverse to this pull direction and thereby disengages the catch from the element of the grid ceiling behind which it is engaged.

In an embodiment of the removal tool, part of a boundary of the catch holding region is formed by an end edge formed on the second portion and by edge portions of the first portion and of the tongue, which edge portions are substantially parallel to one another. In addition in this embodiment, the recess is continued by sloping edge portions of the first portion and of the tongue that are joined to the parallel edge portions of the first portion and of the tongue. In this case, the sloping edge portions run at an angle to the substantially parallel edge portions of the first portion and of the tongue, and the catch can be introduced into the catch holding region through a space between the sloping edge portions. The parallel edge portions, which in particular can run substantially perpendicular to the end edge and in the intended pull direction of the removal tool, allow the end edge of the recess to slide over the sloping slide of the catch during pulling in order to release the catch. The sloping edge portion of the tongue allows the catch to be introduced more easily into the space and the catch holding region. This is useful when releasing the catch by introducing the removal tool through a gap between the luminaire and the element of the grid ceiling behind which the catch is engaged, because in this case, the catch will often barely be visible from a visible side of the grid ceiling. The sloping edge portion of the first portion can help, when pulling on the removal tool using the handle portion, to apply the pulling force effectively to the catch and to prevent moments about the catch that might result in the removal tool becoming wedged or jammed.

In a further embodiment of the removal tool, the two sloping edge portions of the first portion and of the tongue can run substantially parallel to each other.

According to another embodiment, the removal tool can be flat in design, in particular made from a flat material, for instance a sheet metal. A flat removal tool of this type is advantageous for introducing into a gap between the luminaire and the element of the grid ceiling when removing the luminaire.

In one embodiment, the removal tool can be stamped from a metal sheet, for instance a sheet made of steel or stainless steel. A tool with such a design is cheap to produce.

The above embodiments and developments can be combined with one another in any practical way. Further possible embodiments, developments and improvements of the invention also include combinations of features of the invention that are described above or below with regard to the embodiments, even if these combinations are not mentioned explicitly. In particular, in this case a person skilled in the art will also add individual aspects as improvements or additions to the relevant basic form of the present invention.

BRIEF DESCRIPTION OF THE DRAWINGS

The invention is described in greater detail below with reference to the embodiments presented in the schematic diagrams, in which:

FIG. 1 shows a perspective view of a luminaire according to an embodiment of the invention;

FIG. 2 shows a perspective enlarged view of a portion of the luminaire of FIG. 1;

Figure 3:
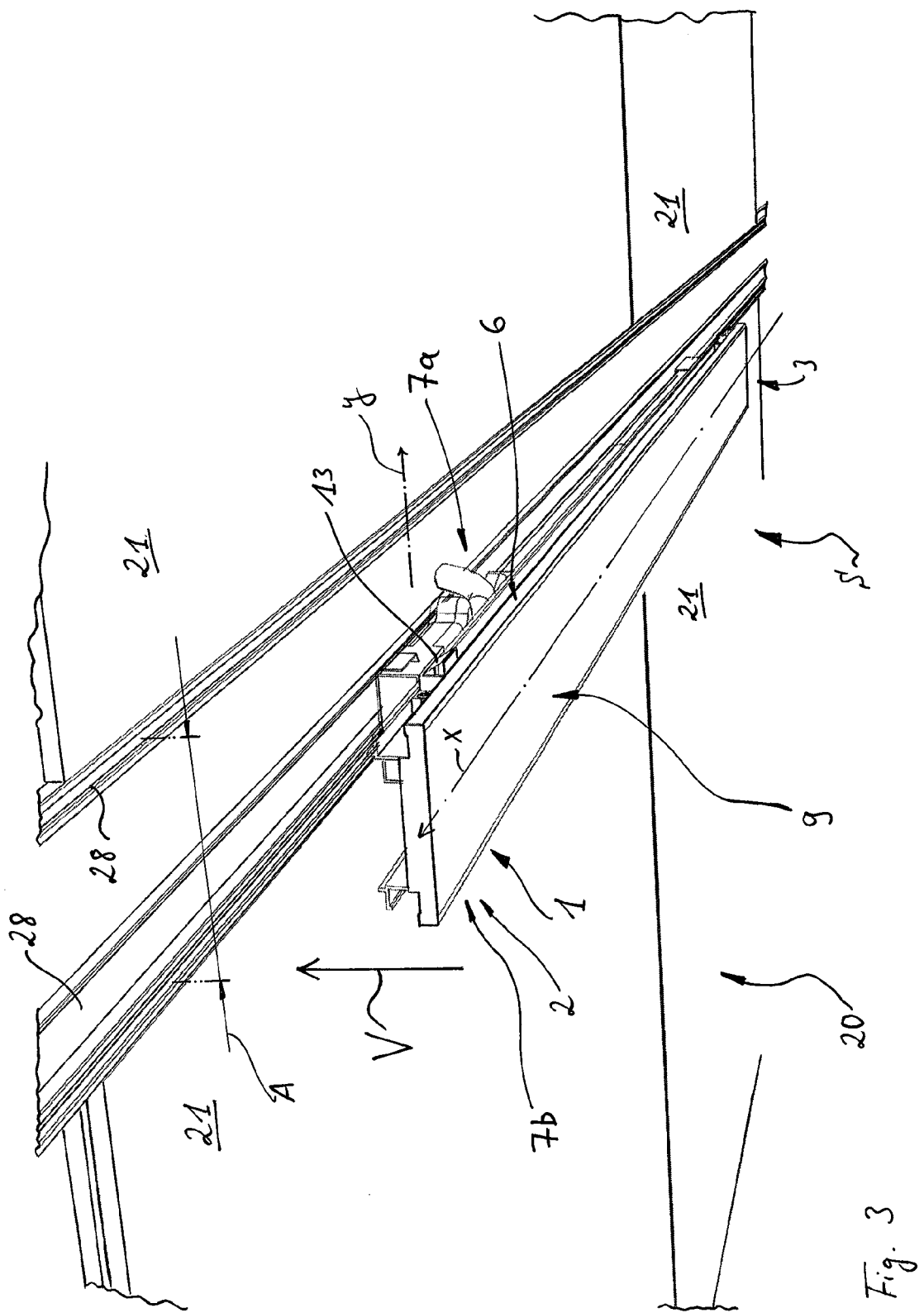
FIG. 3 shows a grid ceiling and a luminaire according to the embodiment in a perspective view from below in order to illustrate an installation procedure, in which the luminaire in FIG. 3 has not yet been brought into contact with the grid ceiling.

The accompanying drawings are intended to provide greater understanding of the embodiments of the invention. They illustrate embodiments and are used in conjunction with the description to explain principles and concepts of the invention. Other embodiments and many of the stated advantages are apparent from the drawings. The elements of the drawings are not necessarily shown to scale.

In the figures, elements that are identical and have the same function and effect are denoted by the same reference signs unless otherwise stated.

DETAILED DESCRIPTION OF THE EMBODIMENTS

FIG. 1 shows a luminaire 1 for installing in a grid ceiling according to an embodiment of the present invention. The luminaire 1 has a substantially rectangular basic shape. A longitudinal direction of the luminaire 1 is labelled in FIG. 1 with the reference sign x, and a transverse direction of the luminaire 1 with the reference sign y. In the example shown, a width B of the luminaire 1 can preferably measure approximately B=100 mm, and a length L of the luminaire 1 approximately L=1200 mm, where it shall be understood that these dimensions are only specified here by way of example, and the width B and the length L can be chosen to have different values from these in numerous useful and advantageous variants. For example, for a width B of approximately B=100 mm, the length L can measure approximately L=2400 mm according to an alternative embodiment.

The luminaire 1 is shown in perspective in FIG. 1 such that the upper face of the luminaire 1 that is not visible in the installed state of the luminaire 1 can be seen in the figure. In the region of this upper face, the luminaire 1 comprises an electrical connection device 4. In addition, FIG. 1 shows a cover 5, which can be in the form of a cover plate for instance. The cover 5 in particular covers electrical and/or electronic components of the luminaire 1.

As shown FIGS. 1 and 2, the luminaire 1 has on opposite longitudinal sides 7a, 7b grooves 8 that extend in the longitudinal direction x of the luminaire 1 along the entire length L and are open to the outside. The cross-section of each of the two grooves 8 in the example shown is substantially constant and substantially T-shaped along the longitudinal direction x, the arms of the T-shape that point upwards and downwards in the figure being designed to be relatively short, whereas an opening 8b of the respective groove 8 is relatively wide in the embodiment shown in the figures. Thus, undercuts 8a provided on both sides of the opening 8b of the groove 8 are relatively flat in this example.

In the luminaire 1 shown in FIGS. 1 and 2, a total of four catch units 10 are arranged in the grooves 8. Of the catch units 10, two are arranged on a first longitudinal side 7a of the luminaire 1, and two further catch units are arranged on a second longitudinal side 7b of the luminaire 1, which side is opposite the first longitudinal side 7a. In FIG. 1, only the two catch units 10 on the side 7a are visible, one of which is arranged adjacent to an end region 2 of the luminaire 1, and the other is arranged adjacent to an opposite end region 3 of the luminaire 1. The catch units 10 on the side 7a are thus spaced apart from one another along the longitudinal direction x. Although the two catch units 10 on the side 7b are not visible in FIG. 1, in the example shown they are arranged approximately symmetrically to the catch units 10 on the side 7a with respect to a centre axis M of the luminaire 1 in the longitudinal direction x.

If in variants of the embodiment the length L is chosen to be greater than L=1200 mm, for example to be 2400 mm, then three or four spaced-apart catch units 10 can be arranged on each longitudinal side 7a, 7b of the luminaire 1, which can result in a total number of six or respectively eight catch units 10 per luminaire. An even greater number of catch units 10 per luminaire would also be possible.

The catch units 10 of the luminaire 1 have an identical design. Each of the catch units 10 comprises a movable catch 13 and a catch housing 15, said catch 13 being arranged and guided in the associated catch housing 15 such that it can be displaced in a straight line. In addition, in each of the catch housings 15 a spring element (not visible in the figures) is provided that applies spring tension to the catch 13, thereby spring-loading said catch. The catch 13 is made from a metal material in the embodiment.

The catch housings 15 are designed such that they can be inserted into the grooves 8 along the longitudinal direction x of the luminaire 1. After insertion into the groove 8, the catch housings 15 are each jammed in the respective groove 8 preferably by one or more screws 19, thereby fixing the respective catch unit 10 to the luminaire 1. While the undercuts 8a hold the catch housing 15 in the transverse direction y, the catch housing 15 is fixed in the longitudinal direction x in the groove 8 by a friction fit. Fixing the catch units 10 in the groove 8 by clamping offers a variety of options for positioning the catch units 10.

In the state shown in FIGS. 1 and 2, the catches 13 of the catch units 10 each protrude outwards under the action of the spring tension beyond an associated lateral edge 6 in the region of the longitudinal side 7a or 7b of the luminaire 1, whereas the catch housing 15 does not protrude beyond this lateral edge 6.

Figure 4:
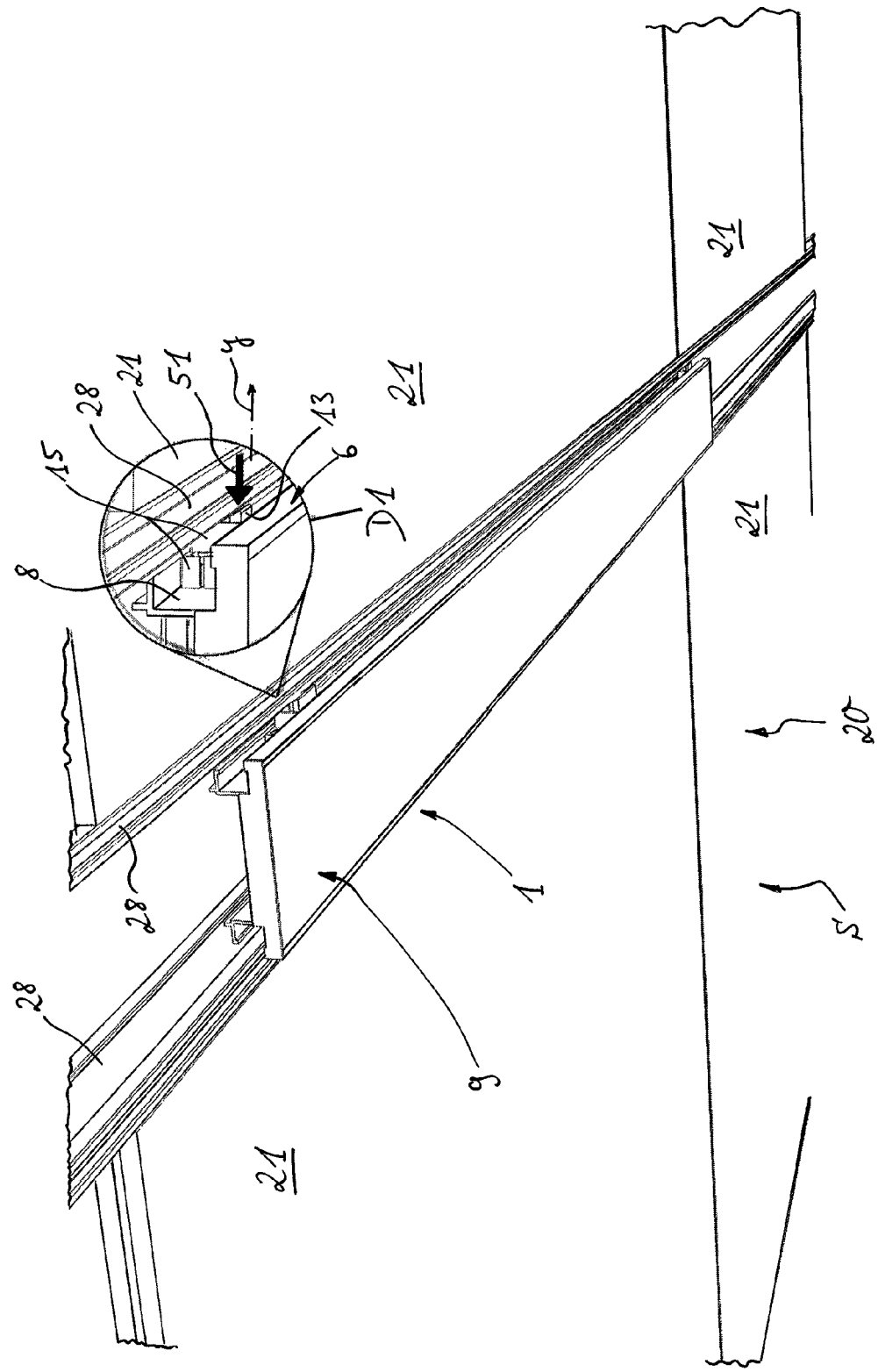
FIG. 4 shows the grid ceiling and the luminaire from FIG. 3 in a state that follows the state shown in FIG. 3 during installation of the luminaire, the luminaire in FIG. 4 not yet being fully installed, together with a detail D1 that shows an enlargement of the region of a catch unit of the luminaire in this state.
Figure 5:
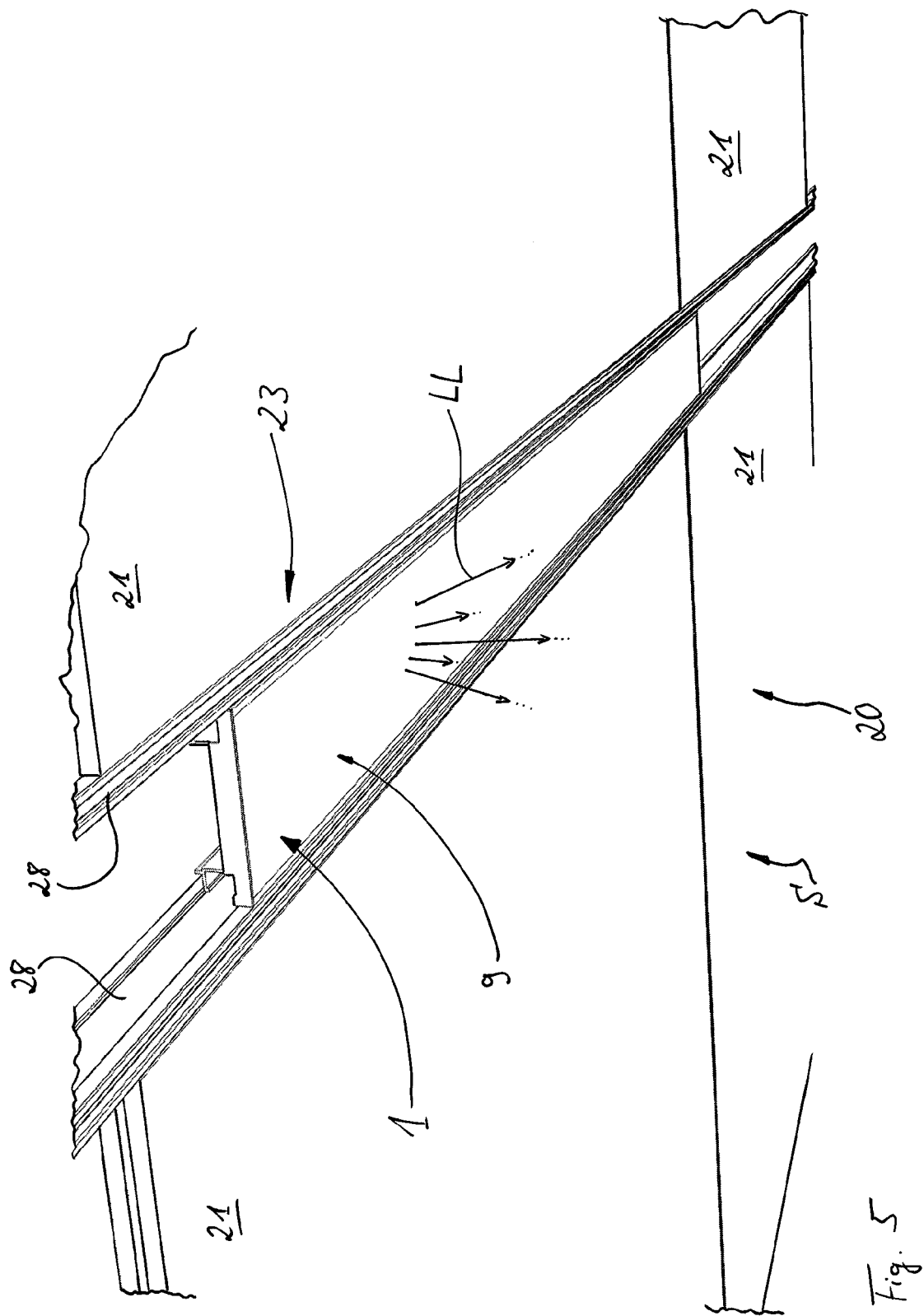
FIG. 5 shows the grid ceiling and the luminaire from FIG. 3, the installation of the luminaire being complete and the luminaire being fully installed.

FIGS. 3 to 5 show a grid ceiling 20 having ceiling elements 21 which are in the form of panels in the example shown, and having a supporting structure for supporting in particular the ceiling elements 21. The supporting structure contains ceiling profile elements 28, which can be made of metal for instance. A visible side of the grid ceiling 20 is denoted by the reference sign S. The figures show only regions of the grid ceiling 20, with just portions of two ceiling profile elements 28 and of some ceiling elements 21 being visible. The two ceiling profile elements 28 shown in FIGS. 3 to 5 run as profile rails for example in a substantially horizontal direction and substantially parallel to each other at a separation A, as indicated in FIG. 3 and also in FIG. 6.

FIG. 3 also shows a luminaire 1 according to the embodiment in a position below the two ceiling profile elements 28. The luminaire 1 is intended to be installed in the space between the two ceiling profile elements 28 shown, in such a way that a bottom face of the luminaire 1 is approximately flush with the ceiling elements 21 and the ceiling profile elements 28. On this bottom face, the luminaire 1 has a light exit region 9, which in this example is substantially rectangular. For example, the light exit region 9 can be formed by a transparent pane or panel which allows light LL (see FIG.

5) provided by the light sources (not shown in the figures) of the luminaire 1 to pass through to the luminaire bottom face and to exit therefrom in order to illuminate the room to be lit. It shall be understood, however, that the light exit region 9 alternatively can have numerous different designs.

Figure 6:
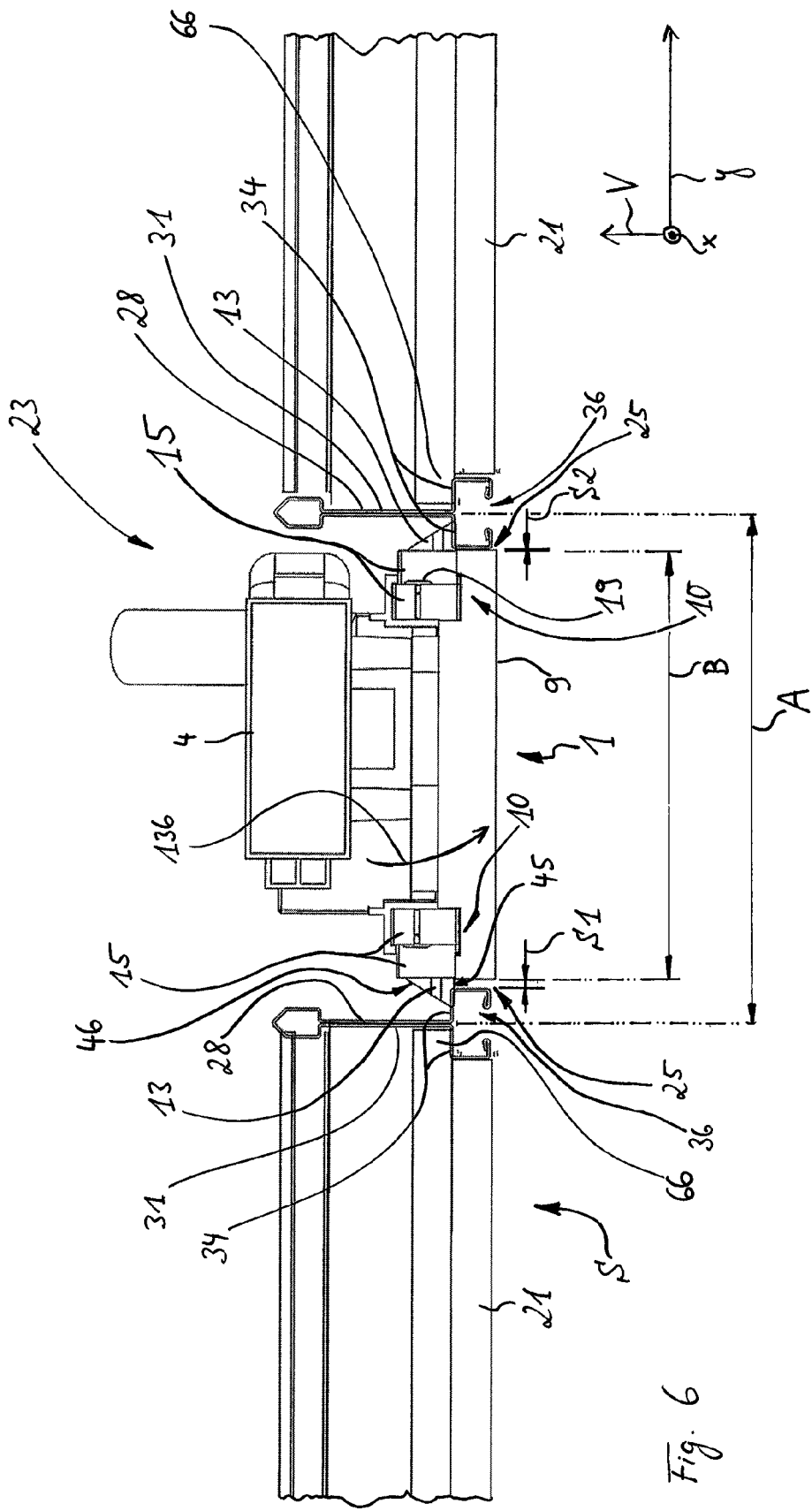
FIG. 6 shows the installed luminaire of FIG. 5 together with portions of the grid ceiling in a cross-sectional view.

As shown in FIG. 6, for instance, the ceiling profile elements 28 are designed to have a cross-section that in parts is in the shape of an inverted T having a link portion 31 and a belt or flange portion 34. The flange portion 34 itself continues in a groove-like profile 36 having an inverted T-shaped geometry. In the embodiment shown, the flange portion 34 runs substantially perpendicular to the link portion 31.

The catches 13, which can be displaced along the transverse direction y, each have a retaining surface 45 that extends substantially parallel to the x-y plane spanning the longitudinal direction x and the transverse direction y (see FIGS. 1 and 6). A second surface of the catch 13, on the other hand, is oriented obliquely to the x-y plane and forms a sloping slide 46. The catches 13 are advantageously additionally equipped with guide grooves 55 in which assigned protrusions 64 provided on the catch housing 15 engage, in a sliding manner, in order to provide a further improved displaceable guidance of the catches 13.

For installation, the luminaire 1 is moved upwards in the vertical direction V onto the ceiling profile elements 28 (see FIG. 3). In this case, the sloping slides 46 of the catches 13 face the grid ceiling 20 and come into contact with the ceiling profile elements 28 as the luminaire 1 continues to be inserted between the ceiling profile elements 28. Thus, the sloping slides 46 at an angle to the vertical direction of V cause the spring-loaded catches 13 to be depressed into the respective catch housings against the respective springs in the direction of the arrow 51 parallel to the transverse direction y (see the detail D1 in FIG. 4).

As the luminaire 1 continues to be inserted between the ceiling profile elements 28 in the vertical direction V, the catches 13 arrive behind parts of the flange portions 34 of the ceiling profile elements 28 located on both sides of the luminaire 1 (see FIG. 6). Under the effect of the spring tension, the catches 13 automatically move behind the respective flange portion 34 and engage behind a region thereof. In other words, under the effect of the spring elements, the catches 13 return to their respective positions in which the catches 13 protrude beyond the edges 6.

The luminaire 1 is thus held securely. There is thus no need for a tool, in particular a screwdriver or the like, in order to be able to install the luminaire 1 in the grid ceiling 20; instead, the luminaire 1 is simply inserted between the profile elements 28 until the catches 13 snap into place. Advantageously, a "click" or "snap" sound audible to the installation engineer can tell the engineer that the catches 13 have engaged behind the respective profiles 28 assigned to each catch.

As is also evident in FIG. 6, portions 66 of the ceiling elements 21 rest on portions of the ceiling profile elements 28 that face away from the luminaire 1. The ceiling profile elements 28 form components of the supporting structure for the grid ceiling 20. In the embodiment shown, in the grid ceiling 20 the luminaire 1 is held between the ceiling profile elements 28 solely by the effect of the four catches 13, which engage behind the profile elements 28. The ceiling profile elements 28 and the luminaire 1 form components of an assembly 23 for the grid ceiling 20.

It should be pointed out that a plurality of luminaires 1 can be installed adjoining one another in their longitudinal direction x in the same way between the ceiling profile elements 28.

Figure 7:
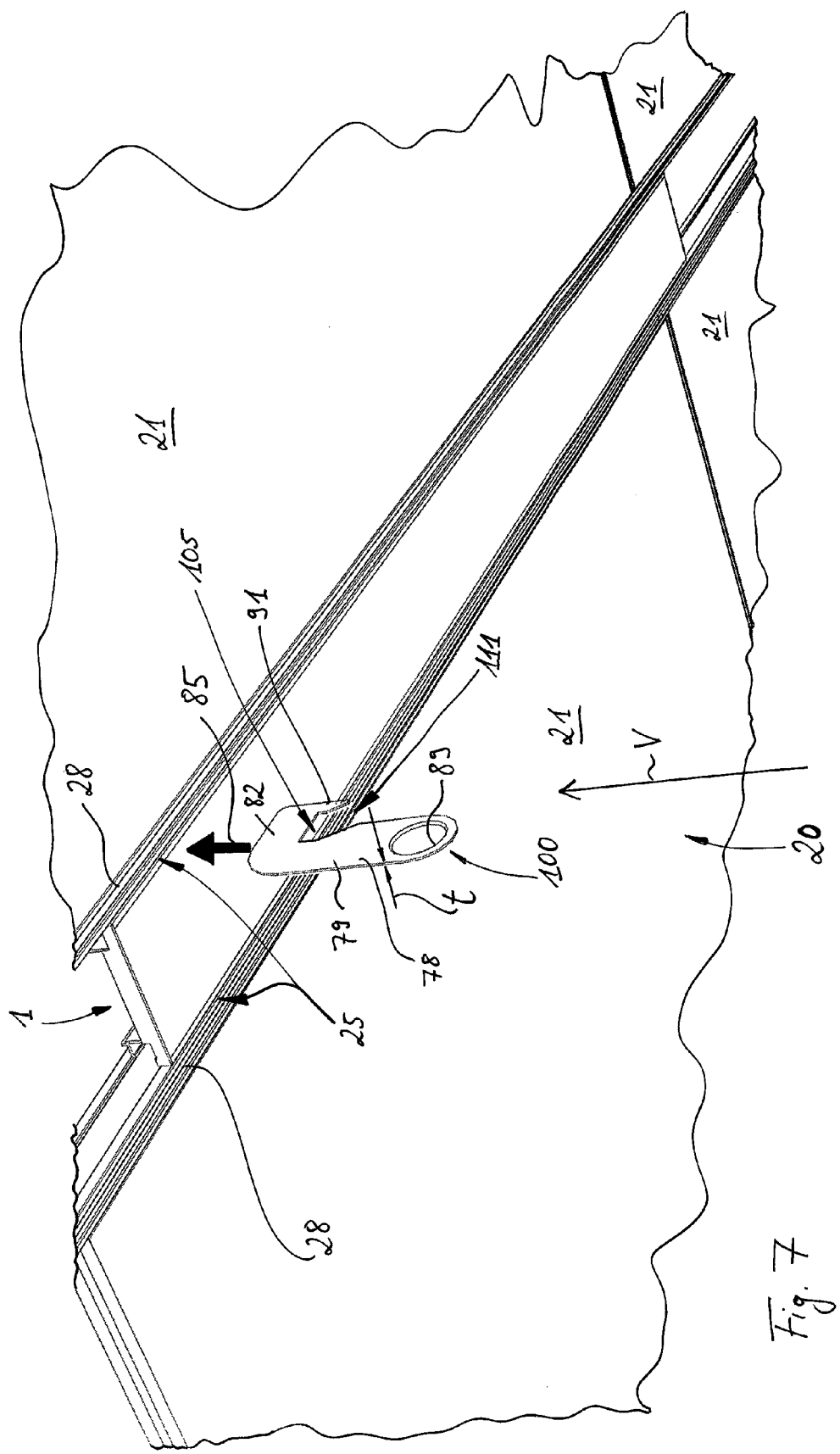
FIG. 7 shows the grid ceiling and the luminaire according to the embodiment in the installed state of FIG. 5, in which, in preparing to remove the luminaire, a removal tool is inserted into a gap between the luminaire and a ceiling profile element of a supporting structure of the grid ceiling.
Figure 8:
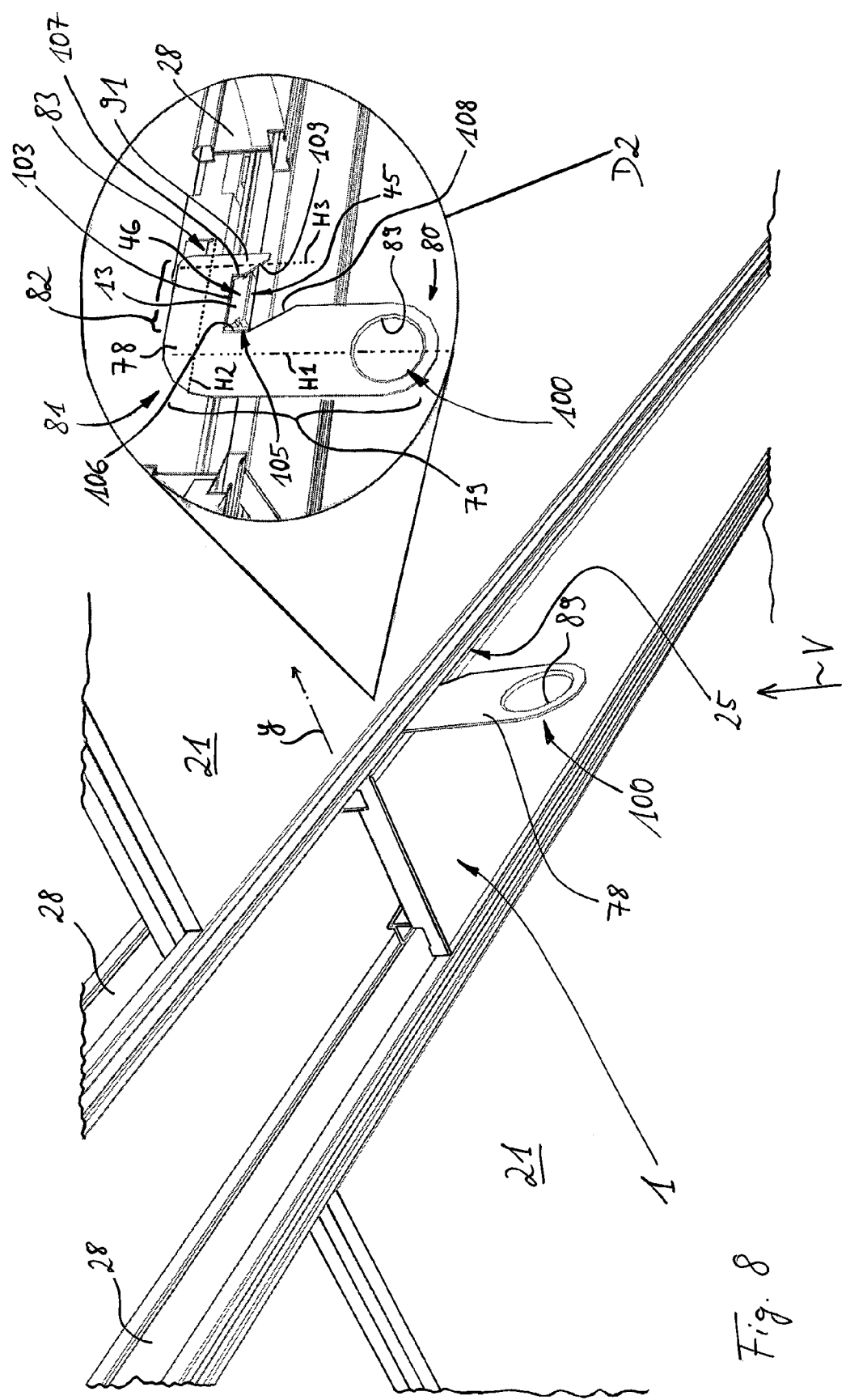
FIG. 8 shows the grid ceiling and the luminaire according to the embodiment in a state that follows the state shown in FIG. 7 during removal of the luminaire and in which state the removal tool is already inserted in the gap, together with a detail D2 showing the removal tool engaging over a catch of the luminaire, and in which a ceiling element and regions of a ceiling profile element have been left out for clarity.
Figure 9:
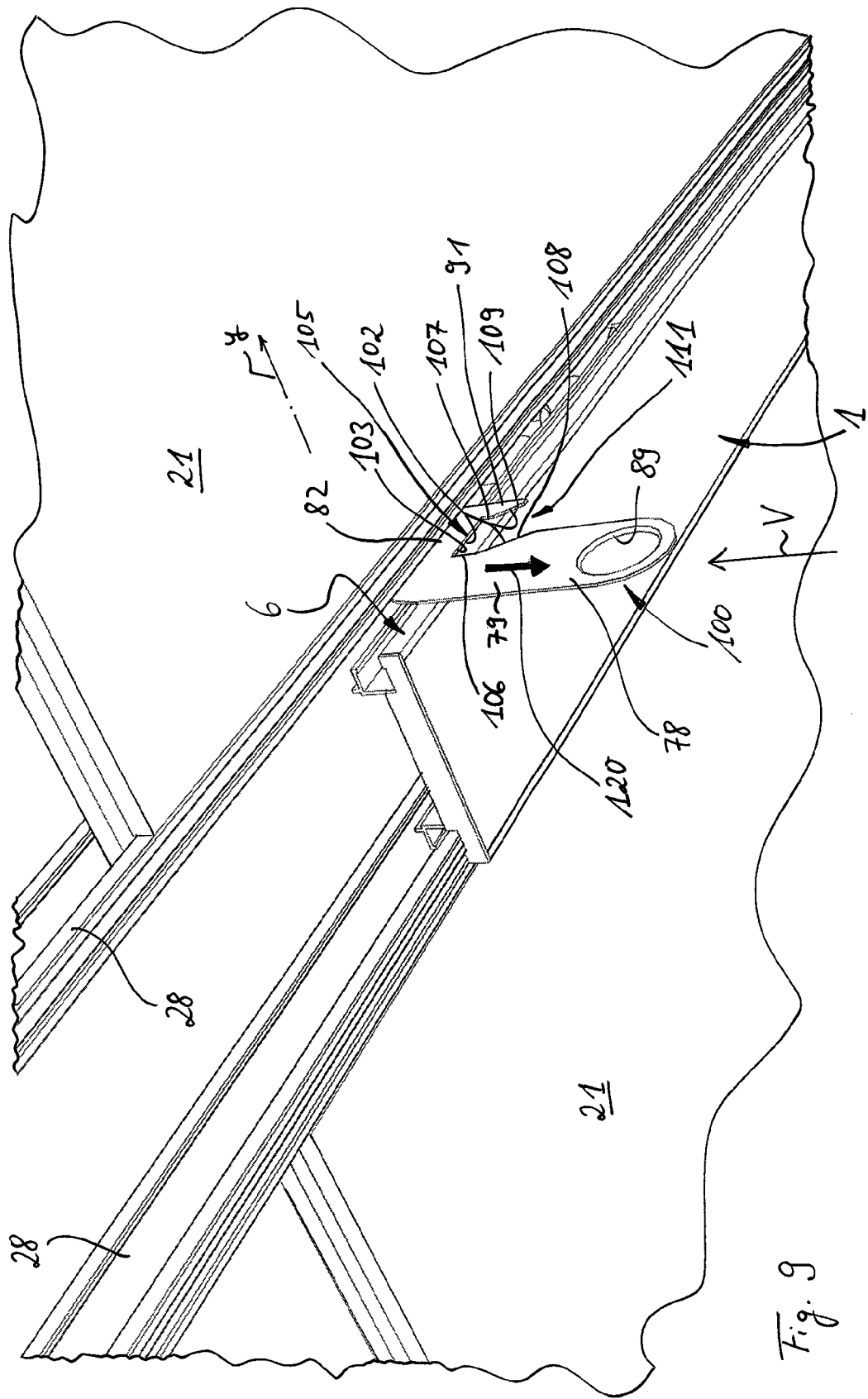
FIG. 9 shows the grid ceiling and the luminaire according to the embodiment during detachment and removal of the luminaire in a state that follows the state shown in FIG. 8.

FIGS. 7, 8 and 9 show a removal of the luminaire 1 by way of example. In order to remove the luminaire 1, a removal tool 78 or a plurality of identical removal tools 78 are used (see FIG. 7). The removal tool 78 takes the form of a sheet metal part, for instance stamped from sheet steel, having a sheet thickness t of approximately t=1 mm for example. The removal tool 78 is used for releasing or disengaging the catches 13 and can thus also be referred to as a release sheet.

As is illustrated clearly in particular in the detail D2 in FIG. 8, the removal tool 78 has a first portion 79, a second portion 82 connected to the first portion 79 and a tongue 91 connected to the second portion 82. The first portion 79 is elongated, extending along a main extension direction H1, and is provided with a circular hole 89 in a first end region 80. That portion of the first portion 79 which is provided with the hole 89 forms a handle portion 100 of the tool 78.

The second portion 82 is joined to the first portion 79 in a second end region 81 of the first portion 79, said second portion 82 extending transverse to the first portion 79 and laterally away therefrom along a main extension direction H2. At a far end 83 of the second portion 82 from the end region 81, a tongue 91, which is narrower and shorter than the first portion 79, extends in the same direction as the first portion 79 away from the second portion 82. A main extension direction H3 of the tongue 91 is substantially parallel to the main extension direction H1 of the first portion 79. The first portion 79, the second portion 82 and the tongue 91 thus form approximately an asymmetric U-shape, one arm of which is designed to be significantly shorter and narrower.

In order to remove the luminaire 1, the removal tool 78 is introduced in the direction of the arrow 85 (see FIG. 7) from the visible side S into a gap 25 between the lateral edge 6 of the luminaire 1 and the adjacent ceiling profile element 28. In the embodiment, the tool is introduced substantially along the vertical direction V. In order to locate from the visible side S the position of the catch 13 on an installed luminaire 1, the removal tool 78 can be moved along the luminaire 1 through the gap 25.

The catch 13 can thus be located by the removal tool 78, i.e. the removal tool 78 encounters the catch 13. Then, by slightly pulling down the removal tool 78 in an opposite direction to the arrow 85, the catch 13 comes to rest in a catch holding region 105 of the removal tool 78, and is thus "captured", with the removal tool 78 engaging over the catch 13 (see FIG. 8).

The catch holding region 105 is located between the tongue 91 on one side and the first portion 79 on the other side, and is formed by part of a recess 102, which is open towards an outside edge of the removal tool 78 and is delimited by a part of the first portion 79, by the second portion 82 and by the tongue 91. In detail, the recess 102 is delimited by an end edge 103 formed on the second portion 82, an edge portion 106 of the first portion 79, which edge portion runs substantially perpendicular to the end edge 103, an edge portion 107 of the tongue 91, which edge portion runs substantially perpendicular to the end edge 103, a sloping edge portion 108 of the first portion 79, which edge portion runs at an angle to the end edge 103, and a sloping edge portion 109 of the tongue 91, which edge portion likewise runs at an angle to the end edge 103. The two edge portions 106 and 107 extend away from the end edge 103, the edge portion 108 being joined to the edge portion 106, and the edge portion 109 being joined to the edge portion 107. The edge portions 106 and 107 run substantially parallel to one another. The edge portions 108 and 109 can also be configured to be substantially parallel to each other. Part of the catch holding region 105 is delimited by the end edge 103 and the edge portions 106 and 107.

In the state in which the removal tool 78 is used (see detail D2), the end edge 103 runs substantially perpendicular to a pull direction, which in the example shown corresponds to the vertical V.

As the detail D2 in FIG. 8 shows, the tongue 91 protrudes along its main extension direction H3 beyond the catch 13 downwards in the figure, i.e. in the pull direction, and thus extends past the catch 13 when part of the catch 13 is held in the catch holding region 105 and, as in the detail D2, rests against the end edge 103 formed on the second portion 82.

Hooking in the removal tool 78 in such a manner that the catch 13 comes to rest in the catch holding region 105 is made easier by the sloping edge portion 109 formed on the tongue 91, which creates a slight taper at the end of the tongue 91.

As shown in FIG. 8, the sloping edge portion 109 faces the first portion 79. The sloping edge portion 108 formed on the first portion 79 faces the sloping edge portion 109. As the removal tool 78 is hooked in, the catch 13 slides through a space 111 between the sloping end portions 108 and 109 into the catch holding region 105.

To release the catch 13, the removal tool 78 is pulled downwards in a direction substantially parallel to the vertical direction V along the arrow 120 (see FIG. 9), i.e. in an opposite direction to that in which the removal tool 78 was introduced into the gap 25. The first portion 79 and the tongue 91 are guided sideways, i.e. in the transverse direction y, through the gap 25. The fact that the tongue 91 also protrudes beyond the catch 13 when the end edge 103 rests against the sloping slide 46 of the catch 13 means that the removal tool 78 is guided reliably in the gap 25.

During pulling using the hole 89, part of the end edge 103 of the second portion 82 slides over the inclined sloping slide 46 of the catch 13. Pulling in the arrow direction 120 and the simultaneous support and guidance of the removal tool 78 in the gap 25, in particular against the ceiling profile element 28, cause the catch 13 to be depressed into the catch housing 15 against the spring tension. The catch 13 thereby disengages from the ceiling profile element 28, allowing the luminaire 1 to be released.

The necessary pulling force in direction 120 can be applied by hand by an installation engineer. The hole 89 is used here for inserting a finger in order to be able to pull on the removal tool 78 more effectively. The slope of the edge portion 108 can be used to ensure that the line of action of the pulling force is not shifted sideways excessively relative to the catch 13, thereby reducing moments about the catch 13 and allowing the pulling force to be applied more effectively to the catch 13, i.e. pulling occurs more centrally below the catch 13.

FIG. 6, which shows the luminaire 1 installed in the grid ceiling 20, identifies the two gaps 25 between the luminaire 1 and the ceiling profile element 28 on each side of the luminaire 1, and the respective gap widths S1 and S2. In the case shown in FIG. 6, the luminaire 1 does not sit exactly centrally between the two ceiling profile elements 28, and therefore S1 is larger than S2. In FIG. 6, S1 is larger than the sheet thickness t, i.e. the removal tool 78 can be introduced into the gap 25 on the left in FIG. 6 having the width S1 in order to release the catch 13.

In the embodiment shown in the figures, which has two catches 13 on each of the longitudinal sides 7a and 7b of the luminaire 1, two removal tools 78 can be used simultaneously. In this case, a removal tool 78 "captures", i.e. engages over, the two catches 13 arranged on the same longitudinal side 7a or 7b of the luminaire 1, in FIG. 6 on the side of the gap 25 having the gap width S1, which catches are then released substantially simultaneously, for example, by pulling on the two removal tools at once. In the configurations shown in FIG. 6 by way of example, after releasing the catches 13 of the left side of the luminaire 1 in the figure, the luminaire 1 can already be tilted out and removed from the grid ceiling 20 approximately in the direction of the arrow 136.

The choice of the width B of the luminaire 1 and the separation A of the ceiling profile elements 28, taking into account the dimensions of the profile elements 28 and preferably also the fact that the installed ceiling profile elements 28 may not be in their intended position, can be made such that the gap widths S1 and S2 at least in total are greater than the sheet thickness t of the removal tool 78, in other words (S1+S2)>t. A position of the luminaire 1 between the ceiling profile elements 28, in which position at least one of the gaps 25 has a width S1 or S2 greater than t, can then be achieved if necessary by shifting the installed luminaire 1 slightly in the transverse direction y, for instance.

Of course each of the gap widths S1, S2 individually could also be chosen to be greater than the sheet thickness t, i.e. S1>t and S2>t. For aesthetic reasons, S1 can advantageously be equal to S2. This is particularly useful when the luminaire 1, for example because of the dimensions of components of the luminaire 1 which vanish in the grid ceiling 20 in the installed state, cannot easily be tilted out after releasing the catches 13 of one of the longitudinal sides 7a or 7b. In this case, the catches 13 on both longitudinal sides 7a, 7b of the luminaire 1 are advantageously released by the removal tools 78, and the luminaire 1 is then removed from the grid ceiling 20. For example, the following applies approximately: S1=S2=1.5 mm.

The luminaire 1 can thus be installed between the ceiling profile elements 28 of the grid ceiling 20 by an installation engineer easily without using a tool and in a small amount of time. The luminaire 1 can also be removed easily and quickly. Removal does not require complicated manual operations or a screwdriver or the like. Merely one or more of the removal tools 78 are used in order to release the catches 13 with a simple pulling action.

Although the present invention has been described fully above with reference to preferred embodiments, it is not restricted to these embodiments but can be modified in a variety of ways.

In particular, the present invention can be used advantageously for installing luminaires on grid ceiling profiles that have the widest range of cross-sectional shapes, the position of the catches in relation to the additional components of the luminaire being able to be adapted as necessary to the profile type according to the dimensions and cross-sectional shape of the profile in order to achieve, for example, flush fitting of the luminaire.

In addition, the invention is not limited to luminaires having an elongated basic shape. It is also possible to apply the invention to a luminaire having a square basic shape, for example, or another basic shape, catches being able to be provided if necessary on more than two sides of the luminaire.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German Application No. 10 2014 213 468.4, filed Jul. 10, 2014 are incorporated by reference herein.

The invention claimed is:

1. A luminaire for installing in a grid ceiling, having at least one catch which is arranged in such a way on the luminaire and designed such that the at least one catch snaps into place automatically behind a portion of an element of the grid ceiling during installation of the luminaire and thus engages behind the portion of the element of the grid ceiling in order to hold the luminaire on the grid ceiling,
wherein the luminaire also comprises a catch housing and wherein the at least one catch is displaceably guided in the catch housing, and
wherein the at least one catch and the catch housing in which the at least one catch is guided, form components of a catch unit, and wherein the luminaire comprises at least one groove in which the catch unit is fixed.

2. The luminaire according to claim 1, wherein the at least one catch has a sloping slide which is arranged and oriented such that during installation of the luminaire, the sloping slide faces the grid ceiling and is at an angle to a direction along which the luminaire can be introduced into the grid ceiling in order to install said luminaire.

3. The luminaire according to claim 1, wherein the at least one catch is spring-loaded.

4. The luminaire according to claim 1, wherein the at least one catch is displaceably guided in the catch housing.

5. The luminaire according to claim 1, wherein the catch unit is clamped in the groove and thus fixed therein at least along the groove.

6. The luminaire according to claim 1, wherein the luminaire has a plurality of catches, at least two of the catches being arranged on opposite sides of the luminaire.

7. The luminaire according to claim 1, wherein the luminaire comprises at least two catches of substantially the same design arranged on one side of the luminaire spaced apart from one another along a longitudinal direction of the luminaire.

8. An assembly for a grid ceiling, comprising
at least one ceiling profile element and
at least one luminaire for installing in the grid ceiling,
the luminaire having at least one catch which is arranged in such a way on the luminaire and designed such that the at least one catch snaps into place automatically behind a portion of an element of the grid ceiling during installation of the luminaire and thus engages behind the portion of the element of the grid ceiling in order to hold the luminaire on the grid ceiling,
wherein the luminaire also comprises a catch housing and further wherein the at least one catch is displaceably guided in the catch housing,
wherein the at least one catch and the catch housing in which the at least one catch is guided, form components of a catch unit, and further wherein the luminaire comprises at least one groove in which the catch unit is fixed, and
wherein the at least one catch of the at least one luminaire is a movable catch and engages behind a portion of the ceiling profile element of the grid ceiling, wherein the engaging of the catch behind the ceiling profile element holds the at least one luminaire on the grid ceiling.

9. The assembly according to claim 8, wherein the ceiling profile element is designed to have an inverted T-shape at least in one region of its cross-section, and in that the at least one catch of the at least one luminaire engages behind a portion of a flange segment of the inverted T-shaped region.

10. The assembly according to claim 8, wherein the assembly also comprises at least one ceiling element, part of which rests on the ceiling profile element, the at least one luminaire being in particular substantially flush with the ceiling element and/or the ceiling profile element on a visible side of the grid ceiling.

11. A method for installing the luminaire of claim 1, comprising the steps of:
providing the luminaire having the at least one catch which is arranged in such a way on the luminaire and designed such that the at least one catch snaps into place automatically behind a portion of an element of a grid ceiling during installation of the luminaire and thus engages behind the portion of the element of the grid ceiling in order to hold the luminaire on the grid ceiling; and
moving the luminaire relative to at least one element of the grid ceiling, which element is arranged and fixed in a predefined final position assigned to the element for the purpose of forming the grid ceiling, in such a way that the at least one catch of the luminaire snaps into place automatically behind a portion of the element of the grid ceiling, and by the automatic snapping into place engages behind the portion of the element of the grid ceiling in order to hold the luminaire on the grid ceiling.

12. A method for removing the luminaire of claim 1 having the at least one catch which is arranged in such a way on the luminaire and designed such that the at least one catch snaps into place automatically behind a portion of an element of a grid ceiling during installation of the luminaire and thus engages behind the portion of the element of the grid ceiling in order to hold the luminaire on the grid ceiling and installed in the grid ceiling, the method comprising the steps of:
inserting a designated removal tool in an insertion direction from a visible side of the grid ceiling into a gap between the element of the grid ceiling and the luminaire;
the removal tool engaging over the movable catch of the luminaire, which catch engages behind a portion of the element of the grid ceiling in order to hold the luminaire on the grid ceiling; and
pulling on the removal tool in a direction substantially opposite to the insertion direction, wherein the removal tool is guided in the gap between the element and the luminaire in order to apply to the catch a force that causes the catch to disengage from the portion of the element.

* * * * *